United States Patent
Yonge, III et al.

(10) Patent No.: US 8,930,572 B2
(45) Date of Patent: Jan. 6, 2015

(54) PATH SELECTION FOR ROUTING TRAFFIC IN A NETWORK

(71) Applicant: QUALCOMM Incorporated, San Diego, CA (US)

(72) Inventors: Lawrence Winston Yonge, III, Summerfield, FL (US); Srinivas Katar, Gainesville, FL (US); Manjunath Anandarama Krishnam, Gainesville, FL (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/873,168

(22) Filed: Apr. 29, 2013

(65) Prior Publication Data
US 2013/0235730 A1    Sep. 12, 2013

Related U.S. Application Data

(63) Continuation of application No. 12/108,334, filed on Apr. 23, 2008, now Pat. No. 8,510,470.

(60) Provisional application No. 60/941,949, filed on Jun. 4, 2007.

(51) Int. Cl.
| | |
|---|---|
| G06F 15/173 | (2006.01) |
| H04L 12/26 | (2006.01) |
| H04L 12/413 | (2006.01) |
| H04L 12/733 | (2013.01) |
| H04L 12/761 | (2013.01) |
| H04L 12/721 | (2013.01) |
| H04L 12/915 | (2013.01) |
| H04L 12/28 | (2006.01) |
| H04L 12/729 | (2013.01) |
| H04L 12/727 | (2013.01) |
| H04L 12/44 | (2006.01) |

(52) U.S. Cl.
CPC ............ *H04L 47/787* (2013.01); *H04L 12/413* (2013.01); *H04L 45/122* (2013.01); *H04L 45/16* (2013.01); *H04B 2203/5445* (2013.01); *H04L 45/123* (2013.01); *H04L 12/44* (2013.01); *H04L 12/2801* (2013.01); *H04L 45/125* (2013.01); *H04L 45/12* (2013.01); *H04L 45/121* (2013.01); *H04L 12/2856* (2013.01)
USPC .......................................... 709/241; 370/236

(58) Field of Classification Search
None
See application file for complete search history.

(56) References Cited

U.S. PATENT DOCUMENTS

| | | |
|---|---|---|
| 4,578,530 A | 3/1986 | Zeidler |
| 4,689,786 A | 8/1987 | Sidhu et al. |

(Continued)

FOREIGN PATENT DOCUMENTS

| | | |
|---|---|---|
| EP | 1748574 | 1/2007 |
| EP | 1748597 A1 | 1/2007 |

(Continued)

OTHER PUBLICATIONS

Afkhamie et al., "An Overview of the upcoming HomePlug AV Standard", May 2005, IEEE-0-7803-8844-5/05, pp. 400-404.

(Continued)

*Primary Examiner* — Afshawn Towfighi
(74) *Attorney, Agent, or Firm* — DeLizio Gilliam, PLLC

(57) ABSTRACT

Methods, systems, and apparatuses are described for communicating among stations in a network. A station in the network can determine costs between that station and a headend through a number of other stations. The station can select a low cost path from among the possible paths. Cost data from the determination can be transmitted from the station to other stations in the network for use in selecting low cost paths at those stations.

40 Claims, 4 Drawing Sheets

(56) References Cited

U.S. PATENT DOCUMENTS

| | | |
|---|---|---|
| 4,807,248 A | 2/1989 | Pyatt et al. |
| 5,328,530 A | 7/1994 | Semiatin et al. |
| 5,359,625 A | 10/1994 | Vander Mey et al. |
| 5,491,750 A | 2/1996 | Bellare et al. |
| 5,570,355 A | 10/1996 | Dail et al. |
| 5,617,421 A | 4/1997 | Chin et al. |
| 5,682,428 A | 10/1997 | Johnson |
| 5,732,076 A | 3/1998 | Ketseoglou et al. |
| 6,074,086 A | 6/2000 | Yonge, III |
| 6,111,919 A | 8/2000 | Yonge, III |
| 6,141,355 A | 10/2000 | Palmer et al. |
| 6,167,137 A | 12/2000 | Marino et al. |
| 6,173,400 B1 | 1/2001 | Perlman et al. |
| 6,185,185 B1 | 2/2001 | Bass et al. |
| 6,188,690 B1 | 2/2001 | Holden et al. |
| 6,189,040 B1 | 2/2001 | Oohara |
| 6,201,794 B1 | 3/2001 | Stewart et al. |
| 6,243,761 B1 | 6/2001 | Mogul et al. |
| 6,269,132 B1 | 7/2001 | Yonge, III |
| 6,269,163 B1 | 7/2001 | Rivest et al. |
| 6,272,135 B1 | 8/2001 | Nakatsugawa |
| 6,278,685 B1 | 8/2001 | Yonge, III |
| 6,307,940 B1 | 10/2001 | Yamamoto et al. |
| 6,310,892 B1 | 10/2001 | Olkin |
| 6,388,995 B1 | 5/2002 | Gai et al. |
| 6,519,231 B1 | 2/2003 | Ding et al. |
| 6,574,195 B2 | 6/2003 | Roberts |
| 6,591,364 B1 | 7/2003 | Patel |
| 6,606,303 B1 * | 8/2003 | Hassel et al. ............... 370/238 |
| 6,631,136 B1 | 10/2003 | Chowdhury et al. |
| 6,711,163 B1 | 3/2004 | Reid et al. |
| 6,775,656 B1 | 8/2004 | Gettwart et al. |
| 6,804,252 B1 | 10/2004 | Johnson |
| 6,904,462 B1 | 6/2005 | Sinha |
| 6,910,136 B1 | 6/2005 | Wasserman et al. |
| 7,039,021 B1 | 5/2006 | Kokudo |
| 7,085,284 B1 | 8/2006 | Negus |
| 7,181,620 B1 | 2/2007 | Hur |
| 7,234,058 B1 | 6/2007 | Baugher et al. |
| 7,346,021 B2 | 3/2008 | Yoshizawa et al. |
| 7,350,076 B1 | 3/2008 | Young et al. |
| 7,352,770 B1 | 4/2008 | Yonge, III |
| 7,369,579 B2 | 5/2008 | Logvinov et al. |
| 7,395,097 B2 | 7/2008 | Perdomo et al. |
| 7,409,543 B1 | 8/2008 | Bjorn |
| 7,496,039 B2 | 2/2009 | Yamada et al. |
| 7,506,042 B2 | 3/2009 | Ayyagari |
| 7,558,294 B2 | 7/2009 | Yonge, III |
| 7,558,575 B2 | 7/2009 | Losh et al. |
| 7,573,891 B1 * | 8/2009 | Chow et al. ............... 370/401 |
| 7,609,681 B2 | 10/2009 | Kurobe et al. |
| 7,623,542 B2 | 11/2009 | Yonge et al. |
| 7,756,039 B2 | 7/2010 | Yonge, III |
| 7,797,751 B1 | 9/2010 | Hughes et al. |
| 7,804,842 B2 | 9/2010 | Malik et al. |
| 7,826,475 B2 | 11/2010 | Lee et al. |
| 7,826,618 B2 | 11/2010 | Klingler et al. |
| 7,894,487 B2 | 2/2011 | Yonge, III |
| 7,949,356 B2 | 5/2011 | Yonge, III |
| 7,961,694 B1 | 6/2011 | Chan et al. |
| 8,112,358 B2 | 2/2012 | Yonge, III |
| 8,170,051 B2 | 5/2012 | Yonge, III |
| 8,429,406 B2 | 4/2013 | Yonge, III |
| 8,467,369 B2 | 6/2013 | Yonge, III |
| 8,488,615 B2 | 7/2013 | Yonge, III et al. |
| 8,503,480 B2 | 8/2013 | Yonge, III et al. |
| 2001/0000709 A1 | 5/2001 | Takahashi et al. |
| 2002/0015496 A1 | 2/2002 | Weaver et al. |
| 2002/0025810 A1 | 2/2002 | Takayama et al. |
| 2002/0029260 A1 | 3/2002 | Dobbins et al. |
| 2002/0060986 A1 | 5/2002 | Fukushima et al. |
| 2002/0097679 A1 | 7/2002 | Berenbaum |
| 2002/0107023 A1 | 8/2002 | Chari et al. |
| 2002/0114303 A1 | 8/2002 | Crosbie et al. |
| 2002/0122411 A1 | 9/2002 | Zimmerman et al. |
| 2002/0124177 A1 | 9/2002 | Harper et al. |
| 2002/0137462 A1 | 9/2002 | Rankin |
| 2002/0141417 A1 | 10/2002 | Umayabashi |
| 2003/0012166 A1 | 1/2003 | Benveniste |
| 2003/0018812 A1 | 1/2003 | Lakshminarayana et al. |
| 2003/0048183 A1 | 3/2003 | Vollmer et al. |
| 2003/0067892 A1 | 4/2003 | Beyer et al. |
| 2003/0086437 A1 | 5/2003 | Benveniste |
| 2003/0095551 A1 | 5/2003 | Gotoh et al. |
| 2003/0137993 A1 | 7/2003 | Odman |
| 2003/0193959 A1 | 10/2003 | Lui et al. |
| 2003/0224784 A1 | 12/2003 | Hunt et al. |
| 2003/0228846 A1 | 12/2003 | Berliner et al. |
| 2003/0229783 A1 | 12/2003 | Hardt |
| 2004/0047319 A1 | 3/2004 | Elg |
| 2004/0070912 A1 | 4/2004 | Kopp |
| 2004/0081089 A1 | 4/2004 | Ayyagari et al. |
| 2004/0090982 A1 | 5/2004 | Xu |
| 2004/0128310 A1 | 7/2004 | Zmudzinski et al. |
| 2004/0165532 A1 | 8/2004 | Poor et al. |
| 2004/0190542 A1 | 9/2004 | Ono et al. |
| 2004/0210630 A1 | 10/2004 | Simonnet et al. |
| 2004/0218577 A1 | 11/2004 | Nguyen et al. |
| 2004/0234073 A1 | 11/2004 | Sato et al. |
| 2004/0264428 A1 | 12/2004 | Choi et al. |
| 2005/0001694 A1 | 1/2005 | Berkman |
| 2005/0021539 A1 | 1/2005 | Short et al. |
| 2005/0025176 A1 | 2/2005 | Ko et al. |
| 2005/0068227 A1 | 3/2005 | Caspi et al. |
| 2005/0071631 A1 | 3/2005 | Langer |
| 2005/0089005 A1 | 4/2005 | Sakoda et al. |
| 2005/0114489 A1 | 5/2005 | Yonge, III |
| 2005/0117515 A1 | 6/2005 | Miyake |
| 2005/0117750 A1 | 6/2005 | Rekimoto |
| 2005/0135291 A1 | 6/2005 | Ketchum et al. |
| 2005/0147075 A1 | 7/2005 | Terry |
| 2005/0169222 A1 | 8/2005 | Ayyagari et al. |
| 2005/0190785 A1 | 9/2005 | Yonge, III |
| 2005/0210157 A1 | 9/2005 | Sakoda |
| 2005/0243765 A1 | 11/2005 | Schrader et al. |
| 2005/0249186 A1 | 11/2005 | Kelsey et al. |
| 2006/0002406 A1 | 1/2006 | Ishihara et al. |
| 2006/0039371 A1 | 2/2006 | Castro et al. |
| 2006/0072517 A1 | 4/2006 | Barrow et al. |
| 2006/0077997 A1 | 4/2006 | Yamaguchi et al. |
| 2006/0104301 A1 | 5/2006 | Beyer et al. |
| 2006/0159260 A1 | 7/2006 | Pereira et al. |
| 2006/0168647 A1 | 7/2006 | Chiloyan |
| 2006/0224813 A1 | 10/2006 | Rooholamini et al. |
| 2006/0251017 A1 | 11/2006 | Bishop |
| 2006/0251021 A1 | 11/2006 | Nakano et al. |
| 2006/0252378 A1 | 11/2006 | Bishop |
| 2006/0256741 A1 | 11/2006 | Nozaki |
| 2006/0268746 A1 | 11/2006 | Wijting et al. |
| 2007/0004404 A1 | 1/2007 | Buckley et al. |
| 2007/0019609 A1 * | 1/2007 | Anjum ............... 370/349 |
| 2007/0025244 A1 | 2/2007 | Ayyagari et al. |
| 2007/0025384 A1 | 2/2007 | Ayyagari et al. |
| 2007/0025391 A1 | 2/2007 | Yonge, III |
| 2007/0026794 A1 | 2/2007 | Ayyagari et al. |
| 2007/0030811 A1 | 2/2007 | Frei et al. |
| 2007/0053520 A1 | 3/2007 | Eckleder |
| 2007/0058661 A1 | 3/2007 | Chow |
| 2007/0058732 A1 | 3/2007 | Riedel et al. |
| 2007/0060141 A1 | 3/2007 | Kangude et al. |
| 2007/0097867 A1 | 5/2007 | Kneckt et al. |
| 2007/0115973 A1 | 5/2007 | Koga et al. |
| 2007/0118730 A1 | 5/2007 | Platt |
| 2007/0133388 A1 | 6/2007 | Lee et al. |
| 2007/0133449 A1 | 6/2007 | Schacht et al. |
| 2007/0140185 A1 | 6/2007 | Garg et al. |
| 2007/0147322 A1 | 6/2007 | Agrawal et al. |
| 2007/0189189 A1 | 8/2007 | Andrews et al. |
| 2007/0220570 A1 | 9/2007 | Dawson et al. |
| 2007/0254596 A1 | 11/2007 | Corson et al. |
| 2007/0271398 A1 | 11/2007 | Manchester et al. |
| 2007/0286074 A1 | 12/2007 | Xu |
| 2007/0286111 A1 | 12/2007 | Corson et al. |
| 2008/0002599 A1 | 1/2008 | Yau et al. |

(56) References Cited

U.S. PATENT DOCUMENTS

| | | | |
|---|---|---|---|
| 2008/0141820 A1 | 6/2008 | Park et al. |
| 2008/0151820 A1 | 6/2008 | Solis et al. |
| 2008/0181219 A1 | 7/2008 | Chen et al. |
| 2008/0186230 A1 | 8/2008 | Wengler et al. |
| 2008/0192666 A1 | 8/2008 | Koskan et al. |
| 2008/0212591 A1 | 9/2008 | Wu et al. |
| 2008/0222447 A1 | 9/2008 | Ram et al. |
| 2008/0247408 A1 | 10/2008 | Yoon et al. |
| 2008/0267106 A1 | 10/2008 | Buddhikot et al. |
| 2008/0279126 A1 | 11/2008 | Katar et al. |
| 2008/0298252 A1 | 12/2008 | Yonge, III |
| 2008/0298589 A1 | 12/2008 | Katar et al. |
| 2008/0298590 A1 | 12/2008 | Katar et al. |
| 2008/0298594 A1 | 12/2008 | Yonge, III |
| 2008/0301052 A1 | 12/2008 | Yonge, III |
| 2008/0301446 A1 | 12/2008 | Yonge, III |
| 2008/0310414 A1 | 12/2008 | Yonge, III |
| 2009/0010276 A1 | 1/2009 | Yonge, III |
| 2009/0011782 A1 | 1/2009 | Yonge, III |
| 2009/0034552 A1 | 2/2009 | Yonge, III |
| 2009/0040930 A1 | 2/2009 | Yonge, III |
| 2009/0067389 A1 | 3/2009 | Lee et al. |
| 2009/0074007 A1 | 3/2009 | Yonge, III |
| 2009/0092075 A1 | 4/2009 | Corson et al. |
| 2009/0106551 A1 | 4/2009 | Boren et al. |
| 2009/0116461 A1 | 5/2009 | Yonge, III |
| 2009/0154487 A1 | 6/2009 | Ryan et al. |
| 2009/0207769 A1 | 8/2009 | Park et al. |
| 2009/0311963 A1 | 12/2009 | Haverty |
| 2010/0014444 A1 | 1/2010 | Ghanadan et al. |
| 2010/0072715 A1 | 3/2010 | Crum |
| 2010/0091760 A1 | 4/2010 | Yoon |
| 2010/0100724 A1 | 4/2010 | Kaliski, Jr. |
| 2012/0072715 A1 | 3/2012 | Yonge, III |

FOREIGN PATENT DOCUMENTS

| | | | |
|---|---|---|---|
| EP | 1179919 | | 7/2010 |
| JP | 3107317 | A | 5/1991 |
| JP | 2002135177 | A | 5/2002 |
| JP | 2005073240 | A | 3/2005 |
| WO | 9634329 | A1 | 10/1996 |
| WO | 9857439 | A1 | 12/1998 |
| WO | 02103943 | A1 | 12/2002 |
| WO | 03010096 | | 2/2003 |
| WO | 03100996 | A2 | 12/2003 |
| WO | 2004038980 | A2 | 5/2004 |

OTHER PUBLICATIONS

Co-pending U.S. Appl. No. 13/113,474, filed May 23, 2011, 32 pages.
Co-pending U.S. Appl. No. 13/917,394, filed Jun. 13, 2013, 34 pages.
European Search Report—EP09178487, Search Authority, Munich Patent Office, Jan. 21, 2010.
"U.S. Appl. No. 12/133,315 Final Office Action", Jun. 9, 2011, 38 pages.
Faure, Jean-Philippe et al., Call for Submissions. Draft Standard for Broadband over Power Line Networks: Medium Access Control and Physical Layer Specifications. Feb. 14, 2007, 4 pages.
Faure, Jean-Philippe et al., Coexistence/interoperability Cluster, FTR SG Requirements. Draft Standard for Broadband over Power Line Networks: Medium Access Control and Physical Layer Specifications. Feb. 5, 2007, 13 pages.
HomePlug Powerline Alliance Inc., "HomePlug AV White Paper," Doc. Ver. No. HPAVWP-050818, Aug. 2005, pp. 1-11.
"U.S. Appl. No. 12/133,315 Final Office Action", Jul. 20, 2010, 30 pages.
International Search Report and Written Opinion—PCT/US2008/065811, International Searching Authority, European Patent Office, Nov. 25, 2008.
International Search Report and Written Opinion—PCT/US2008/065831, International Searching Authority, European Patent Office, Feb. 20, 2009, 22 pages.

Katar et al., "Beacon Schedule Persistence to Mitigate Beacon Loss in HomePlug AV Networks," May 2006, IEEE 1-4244-0113-05/06, pp. 184-188.
Lee et al., "HomePlug 1.0 Powerline Communication LANs-Protocol Description and Performance Results version 5.4," 2000, International Journal of Communication Systems, 2000 00: 1-6, pp. 1-25.
Loh et al, Quality of Support and priority Management in HomePNA 2.0 Link Layer, IEEE, 6 pages, 2003.
Muir A., et al., "An Efficient Packet Sensing MAC Protocol for Wireless Networks", Computer Engineering Department School of Engineering, University of California, Aug. 1998, pp. 20.
Opera Specification—Part 1: Technology, Open PLC European Research Alliance, 198 pages, 1006.
Co-pending U.S. Appl. No. 13/933,924, filed Jul. 2, 2013, 36 pages.
"Notification of First Office Action", The State Intellectual Property Office of the People's Republic of China Issued in Chinese Application No. 200610107587.1 Oct. 11, 2010, 6 pages.
"Notification of First Office Action, The State Intellectual Property Office of the People's Republic of China, issued in Chinese Application No. 200880100486.9", Nov. 21, 2012, 17 pages.
"Notification of Reasons for Rejection", Japanese Patent Office Issued in Japanese Patent Application No. 2006-205200 Jan. 18, 2011, 3 pages.
"U.S. Appl. No. 11/970,271 Final Office Action", Jul. 19, 2011, 21 pages.
"U.S. Appl. No. 11/970,271 Office Action", Mar. 9, 2012, 19 pages.
"U.S. Appl. No. 11/970,271 Office Action", Oct. 7, 2011, 20 pages.
"U.S. Appl. No. 11/970,271 Office Action", Dec. 7, 2010, 21 pages.
"U.S. Appl. No. 11/970,297 Final Office Action", Apr. 16, 2012, 32 pages.
"U.S. Appl. No. 11/970,297 Office Action", Mar. 30, 2011, 30 pages.
"U.S. Appl. No. 11/970,297 Office Action", Sep. 29, 2011, 31 pages.
"U.S. Appl. No. 11/970,323 Office Action", Dec. 7, 2010, 12 pages.
"U.S. Appl. No. 11/970,339 Office Action", Jun. 27, 2013, 22 pages.
"U.S. Appl. No. 11/970,339 Final Office Action", Jul. 7, 2011, 14 pages.
"U.S. Appl. No. 11/970,339 Final Office Action", Dec. 11, 2012, 25 pages.
"U.S. Appl. No. 11/970,339 Office Action", Jan. 19, 2011, 22 pages.
"U.S. Appl. No. 11/970,339 Office Action", Jun. 18, 2012, 26 pages.
"U.S. Appl. No. 11/971,446 Final Office Action", Jul. 1, 2011, 17 pages.
"U.S. Appl. No. 11/971,446 Office Action", Feb. 15, 2011, 20 pages.
"U.S. Appl. No. 12/108,334 Final Office Action", Jun. 14, 2011, 28 pages.
"U.S. Appl. No. 12/108,334 Office Action", Aug. 3, 2012, 18 pages.
"U.S. Appl. No. 12/108,334 Office Action", Aug. 3, 2010, 20 pages.
"U.S. Appl. No. 12/108,334 Office Action", Feb. 16, 2011, 26 pages.
"U.S. Appl. No. 12/133,270 Final Office Action", Nov. 18, 2011, 23 pages.
"U.S. Appl. No. 12/133,270 Office Action", Jun. 3, 2011, 67 pages.
"U.S. Appl. No. 12/133,301 Final Office Action", Mar. 22, 2011, 39 pages.
"U.S. Appl. No. 12/133,301 Final Office Action", Sep. 26, 2012, 54 pages.
"U.S. Appl. No. 12/133,301 Office Action", Mar. 1, 2012, 38 pages.
"U.S. Appl. No. 12/133,301 Office Action", Sep. 22, 2010, 42 pages.
"U.S. Appl. No. 12/133,312 Final Office Action", Feb. 16, 2011, 24 pages.
"U.S. Appl. No. 12/133,312 Office Action", Jun. 8, 2011, 24 pages.
"U.S. Appl. No. 12/133,312 Office Action", Jul. 28, 2010, 29 pages.
"U.S. Appl. No. 12/133,315 Office Action", Dec. 24, 2009, 28 pages.
"U.S. Appl. No. 12/133,315 Office Action", Dec. 28, 2010, 36 pages.
"U.S. Appl. No. 12/133,315 Office Action", Aug. 9, 2012, 37 pages.
"U.S. Appl. No. 12/133,325 Final Office Action", Dec. 9, 2010, 33 pages.
"U.S. Appl. No. 12/133,325 Office Action", May 27, 2010, 31 pages.
"U.S. Appl. No. 13/113,474 Office Action", Jun. 17, 2013, 10 pages.
"U.S. Appl. No. 13/303,913 Office Action", Dec. 26, 2012, 37 pages.
U.S. Appl. No. 11/970,339 Final Office Action, 27 pages, Jan. 3, 2014.
"U.S. Appl. No. 12/133,301 Office Action", Sep. 25, 2013, 44 pages.
"U.S. Appl. No. 11/970,339 Office Action", May 22, 2014, 18 pages.
"U.S. Appl. No. 12/133,301 Final Office Action", Apr. 17, 2014, 28 pages.

* cited by examiner

PATH SELECTION FOR ROUTING TRAFFIC IN A NETWORK

RELATED APPLICATION

This application is a continuation of U.S. application Ser. No. 12/108,334 filed on Apr. 23, 2008, which claims a benefit of priority from U.S. Provisional Patent Application No. 60/941,949 filed Jun. 4, 2007. U.S. application Ser. No. 12/108,334 and U.S. Provisional Patent Application No. 60/941,949 are incorporated by reference in this application in their entirety.

TECHNICAL FIELD

The invention relates to routing traffic between stations within a network.

BACKGROUND

Communication networks enable stations belonging to the same network to exchange information. The physical layer of the communication systems exchange signals that encode information to be exchanged between stations. Due to the attenuation and noise on the communication medium, the range of the physical layer signals is limited. In a scenario where one or more stations cannot directly communicate with each other using the physical layer signals, routing and repeating at the higher layer (like a MAC layer or an IP layer) is used to extend the range of the network. Routing protocols enable the selection stations that are the best candidates for retransmitting (repeating) the information. Distance vector based routing and Link State based routing are two well known routing protocols, but other routing protocols or modifications of known protocols can provide superior performance in some networking scenarios.

SUMMARY

This specification describes technologies related to communication networks.

In general, one aspect of the subject matter described in this specification can be embodied in methods that include the actions of determining costs between a determining station and a headend for a number of paths through a respective number of stations, selecting a low cost path between the determining station and the headend based on the determined costs, and transmitting the determined cost of the selected low cost path.

Determining costs between the determining station and the headend can include receiving cost data from the plurality of stations, and estimating the cost between the determining station and the headend through at least two of the plurality of stations. Cost data can be periodically transmitted by the stations. Selecting a low cost path can include selecting a path from among the number of paths having a lowest estimated cost. The path having the lowest estimated cost can be a path having the highest estimated downlink bandwidth, the highest estimated uplink bandwidth, and/or the lowest number of hops to the headend.

Transmitting the determined cost of the selected low cost path can include transmitting an estimated downlink bandwidth, an estimated uplink bandwidth, and/or a number of hops to reach the headend. Determining costs can include receiving bandwidth data from a first transmitting station indicating the effective downlink bandwidth of a first network section, the first network section connecting the first station and the headend, measuring the downlink bandwidth of a second network section, the second network section connecting the determining station and the first station, and estimating the effective downlink bandwidth of a composite network section, the composite network section connecting the determining station and the headend.

Particular embodiments of the subject matter described in this specification can be implemented to realize one or more of the following advantages. Stations in a network, a broadband powerline network for example, can select optimum paths for communication with a headend.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

System Overview

Figure 1:
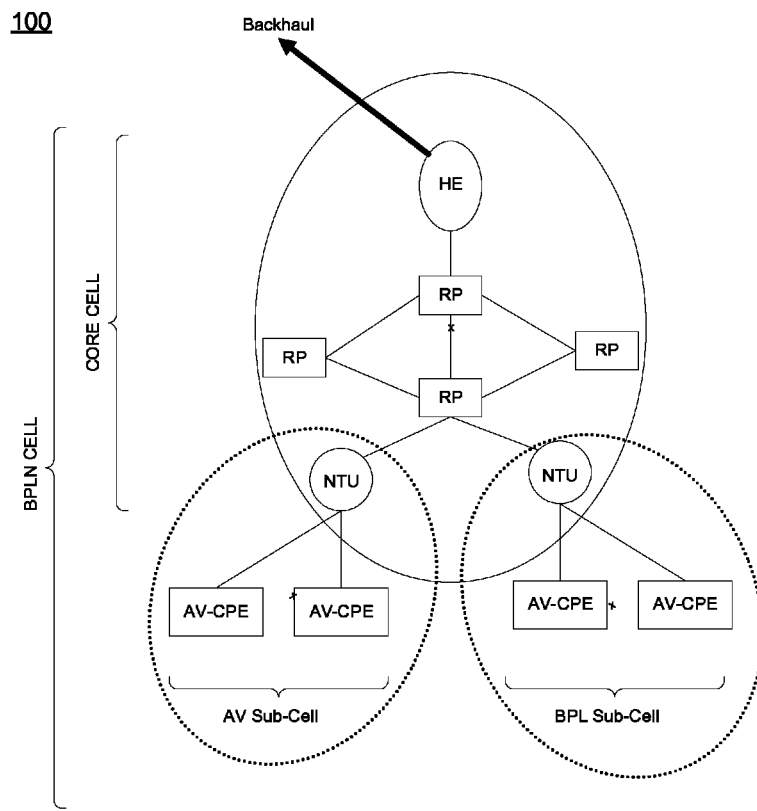
FIG. 1 is a schematic diagram of a communication network.

FIG. 1 is a schematic diagram of a communication network 100. FIG. 1 shows an exemplary network configuration for a communication network 100 such as a broadband power line Network (BPLN) that provides access to a backhaul network. The BPLN can be managed by a service provider entity having access to the underlying physical power line medium. A BPLN is a general purpose network that can be used for several types of applications including, smart grid management, broadband internet access, voice and video delivery services, etc. A BPLN can be deployed on low voltage, medium voltage and high voltage power lines. A BPLN can span an entire neighborhood or it can be deployed within a single multi-dwelling unit. For example, it can be used to provide network service to tenants in an apartment building. While power lines can be used to deploy the BPLN, the network can also be deployed on other wire lines like Coaxial cables and twisted pair.

A BPLN can include one or more cells. A cell is a group of broadband power line (BPL) devices in a BPLN that have similar characteristics such as association management, security, quality of service (QoS) and channel access settings, for example. Cells in a BPLN are logically isolated from each other, and communication to and from the backhaul occurs within a cell. Each cell in a BPLN includes a core-cell and can also include one or more sub-cells. There can be more than one cell on a given physical medium, a power line, for example.

A core-cell can include a headend (HE), repeaters (R), and network termination units (NTUs), but does not include customer premise equipment (CPE). The headend is a device that bridges a cell to the backhaul network. At a given time, a cell will have one active headend and the active headend manages the cell including the core-cell and any associated sub-cells. A repeater is a device that selectively retransmits medium access control (MAC) Service Data Units (MSDUs) to extend the effective range and bandwidth of the BPLN cell. Repeaters also perform routing and QoS functions. A network termination unit is a device that connects a BPLN cell to an end user's network and/or devices. The NTU may in some cases bridge to other network technologies such as WiFi. A single NTU may serve more than one customer. Each sub-cell can be associated with an active NTU. In some implementations, a single device may be designed to perform multiple roles within the network. For example, a single device can be designed to be configurable so as to function as a headend, an NTU, and/or a repeater, or, for further example, a single device can simultaneously perform the network roles of a repeater and an NTU.

Various types of CPE devices are the endpoint nodes in the network and communicate with other nodes in the network through the NTUs.

Communication System Architecture

Each node in the network communicates as a communication "station" (STA) using a physical (PHY) layer protocol that is used by the nodes to send transmissions to any other stations that are close enough to successfully receive the transmissions. STAs that cannot directly communicate with each other use one or more repeater STAs to communicate with each other. Any of a variety of communication system architectures can be used to implement the portion of the network interface module that converts data to and from a signal waveform that is transmitted over the communication medium. An application running on a station provides and receives data to and from the network interface module. A MSDU is a segment of information received by the MAC layer. The MAC layer processes the received MSDUs and prepares them to generate "MAC Protocol Data Units" (MPDUs). MPDU is a segment of information including header and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the wire line (a power line, for example) by the Physical Layer.

Apart from generating MPDUs from MSDUs, the MAC layer provides several functions including channel access control, providing the required QoS for the MSDUs, retransmission of corrupt information, routing and repeating. Channel access control enables stations to share the powerline medium. Several types of channel access control mechanisms like carrier sense multiple access with collision avoidance (CSMA/CA), centralized Time Division Multiple Access (TDMA), distributed TDMA, token based channel access, etc., can be used by the MAC layer. Similarly, a variety of retransmission mechanism can also be used. The Physical layer (PHY) can also use a variety of techniques to enable reliable and efficient transmission over the transmission medium (power line, coax, twisted pair etc). Various modulation techniques like orthogonal frequency division multiplexing (OFDM), and wavelet modulations can be used. Forward error correction (FEC), code line Viterbi codes, Reed-solomon codes, concatenated codes, turbo codes, low density parity check codes, etc., can be employed by the PHY to overcome errors.

In a BPLN, stations that cannot directly communicate with one another use one or more repeaters. A method for finding the least cost routing from any station in the BPLN to the headend is described herein, as well as a method for finding a route between any two stations in the BPLN based on their route to the headend.

Routing Approach to/from Headend (HE)

Figure 2:
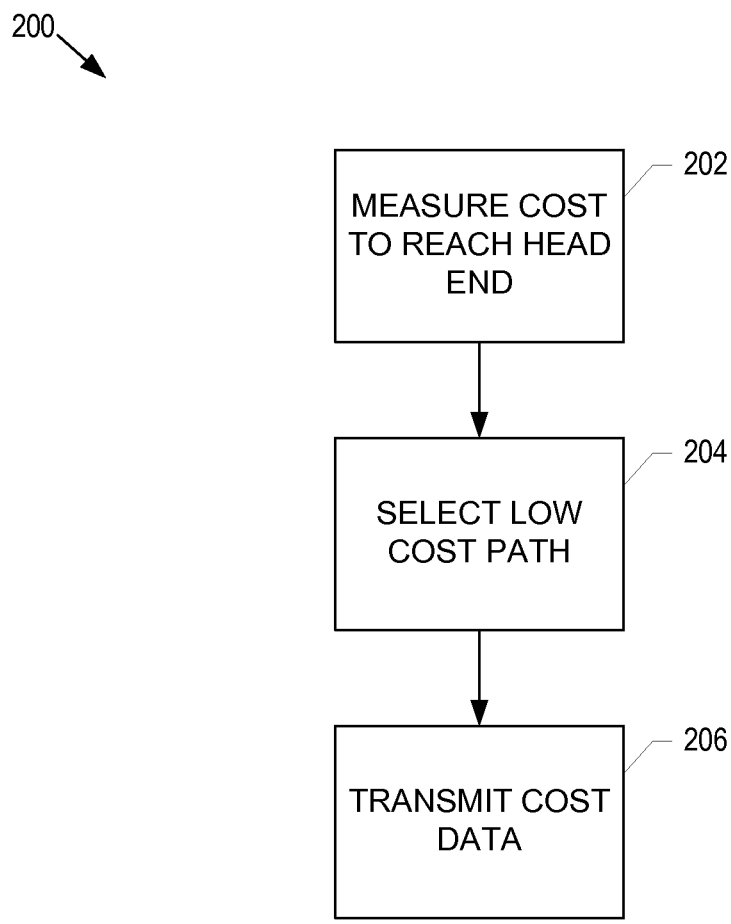
FIG. 2 is a flowchart of an example method for establishing a route to a headend in a communication network.

FIG. 2 is a flowchart of an example method 200 for establishing a route to a headend in a communication network. A cost to reach the headend is measured (202). A cost can be, for example, a number of station hops, an uplink bandwidth, a downlink bandwidth, and/or a network load measurement. The cost to reach the headend can be measured at a station in the network, for example, a repeater station and/or a network termination unit. In an implementation, the station listens for beacon messages (or management messages) transmitted by other stations in the network. The stations can transmit cost data in their beacon messages, and/or cost parameters can be measured by the listening station. For example, cost data from received beacon messages can be combined with one or more costs measured by the listening station.

A low cost path to the headend is selected (204). The low cost path can be selected, for example, at the listening station following an evaluation of several paths discovered during a listening period. A listening period can, for example, be a 10 minute window following power-up of the listening station. The low cost path can be, for example, the path with the highest downlink bandwidth, the path with the highest uplink bandwidth, the path with the lowest hop count to the headend, the path with the least network load, and/or a path having a compromise of these characteristics.

Cost data is transmitted (206). For example, a station can transmit cost data in periodic beacon messages. In some implementations, an effective downlink bandwidth from the headend, an effective uplink bandwidth to the headend, and/or a number of network hops to the headend are included in a periodically transmitted beacon message.

Figure 3:
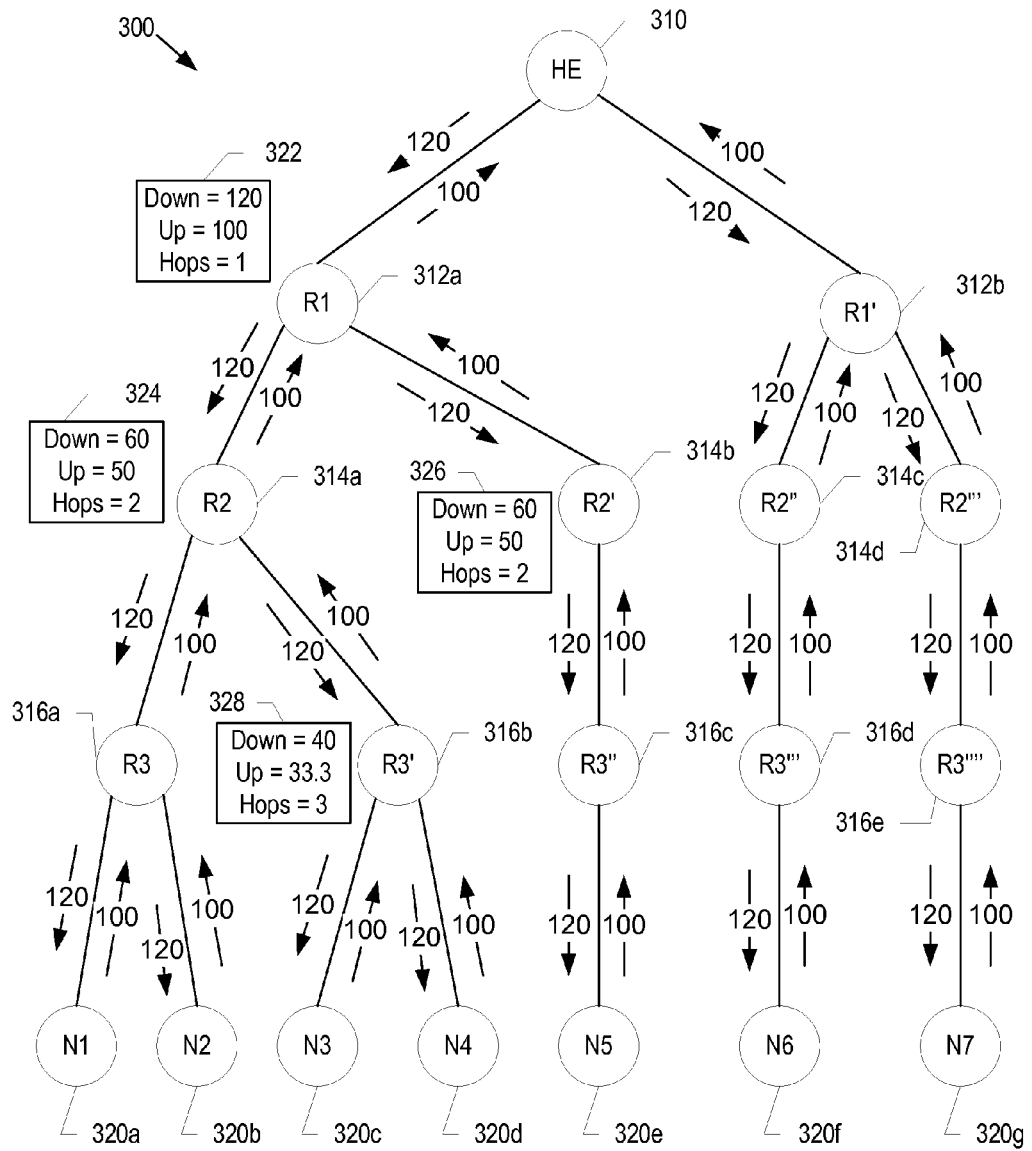
FIG. 3 is a block diagram of an example network.

FIG. 3 is a block diagram of an example network for implementing the method of FIG. 2. The headend 310 connects to a wide area network (not shown) to transmit data to and from the network termination units 320a-320g. Intermediate stations 312a, 312b, 314a-314d, and 316a-316e act as repeaters to pass data across the network. The intermediate stations are needed due to the network termination units and the headend being incapable of direct communication due to, for example, signal attenuation over a distance between them. In the example network topology shown in FIG. 3, the lines connecting the stations indicate communication paths. For example, station R1 312a can communicate directly (without the need of a repeating station) with the headend 310 and has established communication with the headend 310. Other routes between stations are possible, but the lines connecting the stations indicate that this path has been selected for the example network shown.

In the example shown, the communication paths consistently have a downlink bandwidth of 120 Mbits/sec and an uplink bandwidth of 100 Mbits/sec as indicated by the directional arrows.

In some implementations, the headend 310 is a headend of a BPLN. The headend 310 periodically transmits a beacon message. Stations which are within range of the headend can receive (or "hear") the beacon message from the headend 310. These stations can measure the "cost" of communicating with the headend 310. In some implementations, the cost is the downlink bandwidth of the network between themselves and the headend 310, where cost is minimized by seeking the highest bandwidth. For the example shown, both R1 312a and R1' 312*b* can hear the headend, measure the bandwidth of the network between themselves and the headend, and establish a direct communication path to the headend.

It is possible, for example, that the downlink bandwidth between R1' 312*b* and the headend 310 would be so low as to cause R1' 312*b* to instead select a path to the headend 310 through R1 312*a* if such a path would provide a superior downlink bandwidth. For the example network shown, however, R1 312*a* and R1' 312*b* each establish direct communication with the headend 310.

In some implementations, following the selection of the direct path to the headend 310, R1 312*a* and R1' 312*b* begin transmitting their own periodic beacon message. Because of their differing locations in the network, the beacons of R1 and R1' are heard by stations that could not hear the beacon of the headend. Some stations might hear both the beacons of R1 and R1', while others might hear only one. In an implementation, the beacons of R1 and R1' include cost data indicating a cost of communicating to the headend through R1 and R1'. For example, the beacon of R1 can indicate, as is shown in block 322 that the downlink bandwidth between R1 and the headend is 120 Mbit/sec, the uplink bandwidth is 100 Mbit/sec, and the number of hops from R1 to the headend is one.

By listening to beacon messages and cost data included therein, other stations can determine a low cost path to the headend. For example R2 hears the beacon from R1 which indicates the uplink bandwidth, the downlink bandwidth, and the number of hops to the headend from R1. R2 can measure the bandwidth of the network between R2 and R1. R2 can calculate an effective downlink bandwidth between R2 and the headend, through R1 according to the following formula:

$$BW\_Eff_{comp} = \frac{1}{\frac{1}{BW\_Eff_{beacon}} + \frac{1}{BW\_Meas}}$$

Where $BW\_Eff_{comp}$ is the effective downlink bandwidth of the composite network path from R2 to the headend, $BW\_Eff_{beacon}$ is the downlink bandwidth data received in the R1 beacon, and BW_Meas is the measured downlink bandwidth between R2 and R1. In some implementations, an effective uplink bandwidth is similarly calculated.

In some implementations, R2 periodically transmits beacon messages that include the calculated effective downlink and uplink bandwidths and a hop count to reach the headend through R2. For the example shown in FIG. 5B, in block 324, the beacon indicates that the effective downlink bandwidth between R2 and the headend is 60 Mbit/sec, the effective uplink bandwidth is 50 Mbit/sec, and the hop count is two. R2' similarly transmits beacon messages with its own calculated effective bandwidths and hop count as indicated by block 326.

Station R3' can hear station R2. Station R3' similarly calculates its effective bandwidths and includes this data and a hop count in periodically transmitted beacon messages. For the example shown in FIG. 3, station R3' transmits beacons with the data as shown in block 328. The beacon messages of R3' can be heard by stations N3 and N4 which establish communications with R3'.

The mechanism described so far provides a mechanism for stations in the BPLN to send traffic to the headend. For example, N3 sends the traffic intended for the HE to R3'. This traffic then gets routed through R2 and R1 and finally to the HE. For sending traffic from the HE to N3 (or any other STA in the BPLN), the HE and all repeaters maintain information regarding the set of STAs that can be reached through it and their corresponding next hop repeaters (if any). This information is referred to a routing table. In this example, the HE routing table indicates that N3 can be reached through R1. Similarly, the R1 and R2 routing tables indicate that N3 can be reached through R2 and R3' respectively. Finally, the R3' routing table indicates that it can directly reach N3.

To facilitate the population of routing tables at all stations on a route to the HE, in some implementations each station that newly joined the BPLN sends a Route Refresh message that contains the MAC address (or any other unique identifier associated with the new station) to the HE. Stations that are in the route from the STA to the HE will process these messages and add the new station to their routing table.

For example, when N3 first joins the network, it uses the beacons received from R3' to determine that R3' is the next hop destination to reach the HE. N3 will then send a Route Refresh message intended for the HE to R3'. R3' will thus learn that it can directly reach N3 (R3' updates its routing table) and then forwards the message to R2. R2 will learn that N3 can be reach through R3' (R2 updates its routing table) and then forwards the message to R1. R1 will then learn that it can reach N3 through R2 (R1 updates its routing table) and then forwards the message to the HE, which then learns that N3 can be reached through R1 (the HE updates its routing table). This procedure establishes the route from the HE to N3.

Once the initial route is established, STAs can periodically, or based on need, send Route Refresh messages to the HE to ensure that the route from the HE to the station is always current. In some implementations, stations update their routing tables whenever they receive MSDUs intended for the HE from other stations. For example, whenever R1 receives an MSDU from N3 via R2, it updates its routing table to indicate that it can reach N3 through R2. This ensures that the routing tables remain current without the need for sending an explicit Route Refresh message.

Route Changes

Figure 4:
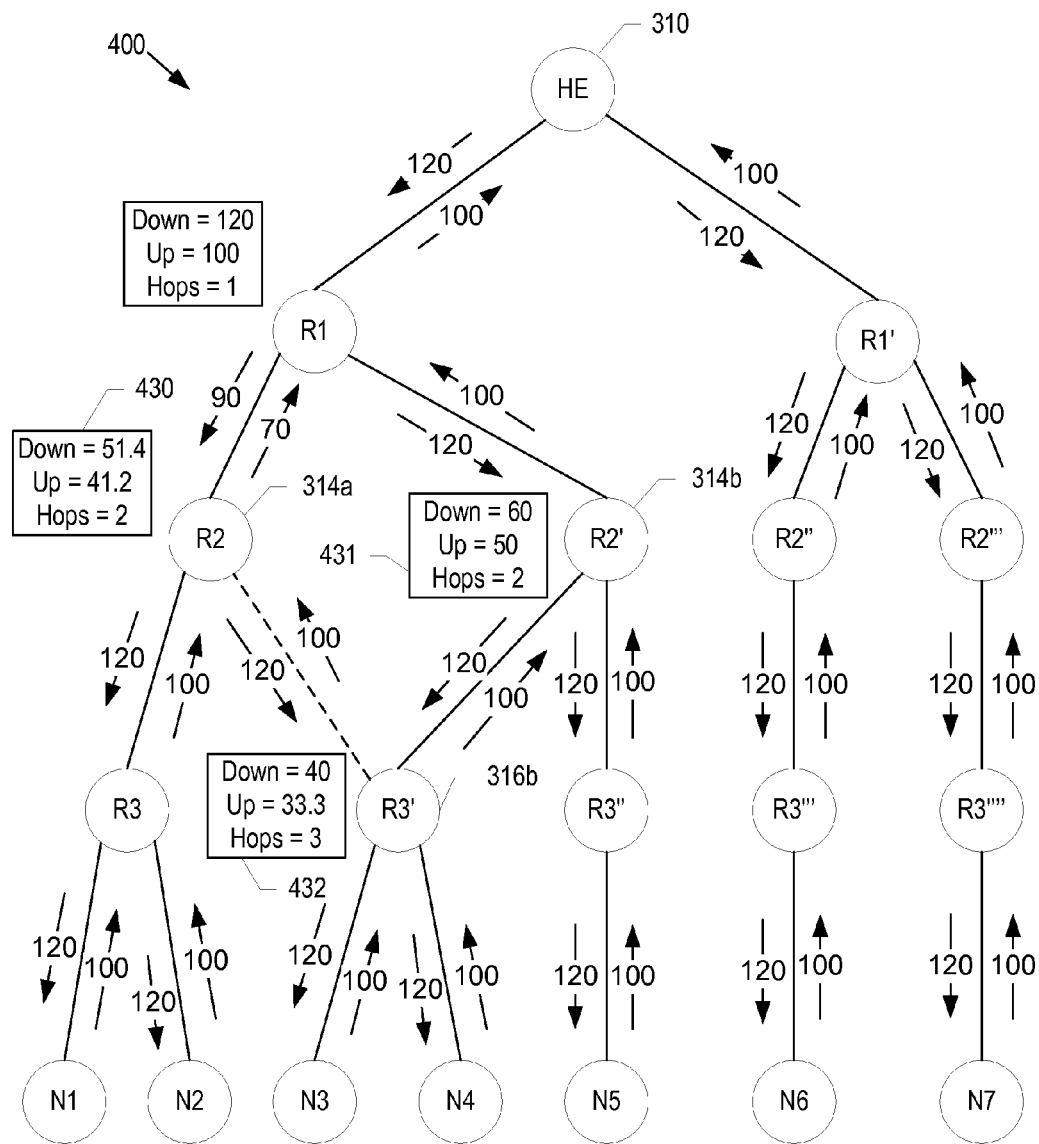
FIG. 4 is a block diagram of the example network of FIG. 3 with modified routing.

A route between a station and the HE can change when the cost on one or more links change. FIG. 4 is a block diagram of the example network of FIG. 3 with modified routing. In FIG. 4, station R3' has altered its selected path to the headend. In FIG. 4, the downlink and uplink bandwidths of the network section between R1 and R2 is 90 and 70 Mbits/sec, respectively, which represents lower bandwidths for the same link than in FIG. 3. In the example of FIG. 4, R3' has altered its selected path to the headend (compared to FIG. 3) by selecting a route through R2' instead of R2.

To change its selected route to the headend, R3' can, for example, perform the method of FIG. 2. A beacon message received at R3' from R2 can include an indication of an effective downlink bandwidth of 51.4 Mbit/sec, an effective uplink bandwidth of 41.2 Mbit/sec, and hop count of 2, as shown in block 430. A beacon message received at R3' from R2' includes an indication of an effective downlink bandwidth of 60 Mbit/sec and an effective uplink bandwidth of 50 Mbit/sec between R2 and the headend. R3' can measure the bandwidth of the network between itself and R2 (dashed line) to determine that the downlink and uplink bandwidths are 120 and 100 Mbits/sec respectively. This measurement can be used with the downlink and uplink data in the beacon received from R2 to calculate an effective bandwidth of the composite network between R3' and the headend through R2. Using the formula above, the calculated effective downlink bandwidth is:

$$BW\_Eff_{comp} = \frac{1}{\frac{1}{51.4} + \frac{1}{120}} = 36.0$$

The effective uplink bandwidth can be similarly calculated.

R3' can additionally hear beacon messages from R2'. Beacon messages from R2' indicate that the effective downlink and uplink bandwidth between R2' and the headend is 60 and 50 Mbit/sec respectively, and the hop count is 2, as shown in block 431. R3' can measure the bandwidth of the network between itself and R2' to determine that the downlink and uplink bandwidths are 120 and 100 Mbits/sec respectively. This measurement can be used with the downlink and uplink data in the beacon received from R2' to calculate an effective bandwidth of the composite network between R3' and the headend through R2'. Using the formula above, the calculated effective downlink bandwidth is:

$$BW\_Eff_{comp} = \frac{1}{\frac{1}{60} + \frac{1}{120}} = 40$$

R3' can select a low cost route to the headend. Comparing the effective downlink bandwidth from the headend through R2 and through R2', R3' can select the route through R2' due to its lower cost (in this example, its superior downlink bandwidth). R3' can transmit periodic beacon messages including the calculated effective downlink and uplink bandwidths of 40 and 33.3 Mbit/sec, respectively. Beacon messages transmitted from R3' can include the data shown in block 432. This data is received by stations within range of R3' and can be used by those stations in determining whether to select a path to the headend through R3' or another route.

In some implementations, a station that changed its route to the HE can send a Route Update message to the headend that contains that list of stations that can be reached through it. All stations that receive the Route Update message can update their Routing Table to include the new routes for the stations listed in the Route Update message. For example, if R3' modifies its route, it can send a Route Update message intended for the HE to R2'. The Route Update message can indicate that N3 and N4 can be reached through R3'. Upon receiving the Route Update message, R2' can update its routing table to indicate that N3 and N4 can be reached through R3', and forward the message to R1. R1 can similarly update its routing table and forward the Route Update message to the HE, which then updates its routing table. Subsequently, all traffic from the HE to R3', N3 and N4 will flow through the modified route.

Routing Between Any Two Stations

The routing mechanism described above also enables routing of traffic between any two stations in the network. For example, in FIG. 3, N3 can send traffic to N1 without the need to route it all the way through the HE. In some implementations, N3 can receive an MSDU from its host that is intended for N1, and N3 can determine that it cannot directly reach N1. N1 then forwards the MSDU to R3' (i.e., its next hop destination to the HE). R3 uses its routing table to determine that it does not have a route to R3' and hence forwards the packet to R2 (i.e., its next hop destination to the HE). R2 then uses its routing table to determine that N1 can be reached through R3 and forwards the MSDU to R3. R3 can then forward the MSDU to N1.

What is claimed is:

1. A method comprising:
    receiving, at a listening station of a network, a bandwidth of a first network section from a first station, wherein the first network section couples the first station to a second station;
    determining a bandwidth of a second network section coupling the listening station and the first station;
    determining costs for a plurality of paths between the listening station and the second station based, at least in part, on received cost data related to the plurality of paths, wherein
        the cost data indicates a bandwidth for a third network section coupling a third station and the second station, and
        the listening station is coupled to the third station, and
        a cost for a first path of the plurality of paths is determined based, at least in part, on the bandwidth of the first network section and the bandwidth of the second network section;
    selecting a path from the plurality of paths based, at least in part, on the costs determined for the plurality of paths; and
    transmitting, from the listening station to the network, a cost of the selected path.

2. The method of claim 1, wherein determining the costs for the plurality of paths comprises:
    determining a cost for a second path of the plurality of paths based, at least in part, on the bandwidth of the third network section.

3. The method of claim 1, wherein the cost data is received from at least one other station via at least one of the plurality of paths.

4. The method of claim 1, wherein transmitting the cost of the selected path comprises:
    transmitting at least one member of a group consisting of a downlink bandwidth, an uplink bandwidth, and a number of hops to reach the second station.

5. The method of claim 1, wherein selecting the path comprises selecting the path from the plurality of paths having a lowest cost.

6. The method of claim 5, wherein the path having the lowest cost is the path with at least one member of a group consisting of a highest downlink bandwidth, a lowest number of hops to the second station, and a highest uplink bandwidth.

7. The method of claim 1, wherein
    the first network section comprises at least one hop between the first station and the second station, and
    the bandwidth of the first network section indicates a bandwidth of a second path through the first network section that comprises the at least one hop.

8. The method of claim 1, wherein determining the costs for the plurality of paths comprises:
    receiving bandwidth data from the first station indicating a downlink bandwidth of the first network section;
    determining a downlink bandwidth of the second network section; and
    determining, based at least in part, on the downlink bandwidth of the first network section and on the downlink bandwidth of the second network section, a downlink bandwidth of a composite network, wherein
        the composite network includes the first network section and the second network section.

9. The method of claim 8, wherein transmitting the cost of the selected path comprises transmitting the downlink bandwidth of the composite network.

10. The method of claim 1, further comprising:
receiving bandwidth data from the first station indicating an effective downlink bandwidth of the first network section;
determining a measured downlink bandwidth of the second network section; and
determining an effective downlink bandwidth of a composite network based, at least in part, on calculating the effective downlink bandwidth according to a formula:

$$BW\_Eff_{comp} = \frac{1}{\frac{1}{BW\_Eff_{first}} + \frac{1}{BW\_Meas}},$$

wherein $BW\_Eff_{comp}$ is the effective downlink bandwidth of the composite network, $BW\_Eff_{first}$ the effective downlink bandwidth of the first network section, and $BW\_Meas$ is the measured downlink bandwidth of the second network section.

11. The method of claim 1, wherein
determining the bandwidth of the second network section is performed in response to the listening station being added to the network.

12. The method of claim 1, further comprising:
storing, in a routing table,
an identifier of the first station, and
cost data related to the first station.

13. The method of claim 1, wherein the cost data comprises at least one member of a group consisting of a downlink bandwidth of the first network section, a downlink bandwidth of the second network section, and a number of hops between the listening station and the first station.

14. The method of claim 1, wherein the second station is a headend station.

15. The method of claim 1, wherein
the network comprises a broadband power line network (BPLN).

16. The method of claim 15, wherein the BPLN comprises at least one member of a group consisting of low voltage lines, medium voltage lines, and high voltage lines.

17. The method of claim 15, wherein the BPLN provides broadband internet access.

18. The method of claim 15, wherein the BPLN provides smart grid management.

19. A method comprising:
determining a first bandwidth of a first network section between a first station and a second station;
determining a second bandwidth of a second network section between a listening station and the first station;
determining a cost for a first path between the listening station and the second station based, at least in part, on the first bandwidth and on the second bandwidth;
receiving cost data related to a second path, wherein
the cost data indicates a third bandwidth for a third network section between a third station and the second station, and
the listening station is coupled to the third station,
determining a cost for the second path based, at least in part, on the third bandwidth;
selecting a path from the first path and the second path based, at least in part, on the cost for the first path and the cost for the second path; and transmitting, from the listening station to a network, a cost of the selected path.

20. The method of claim 19, wherein determining the cost for the first path is based, at least in part, on a number of hops between the listening station and the second station on the first path and determining the cost for the second path is based, at least in part, on a number of hops between the listening station and the second station on the second path.

21. The method of claim 19, wherein determining the first bandwidth is based, at least in part, on estimating a downlink bandwidth between the second station and the listening station.

22. The method of claim 19, wherein determining the first bandwidth is based, at least in part, on receiving bandwidth data from the second station.

23. The method of claim 19, wherein determining the cost for the first path is further based, at least in part, on a network load of the first path.

24. The method of claim 19, wherein the cost data is received periodically.

25. The method of claim 19, wherein the cost data is included in a beacon message.

26. The method of claim 19, wherein
the cost data indicates that the third network section comprises at least one hop between the third station and the second station, and
the second path comprises the at least one hop.

27. The method of claim 19, wherein selecting the path is based, at least in part, on selecting the path having a lowest cost.

28. The method of claim 27, wherein selecting the path having the lowest cost comprises selecting the path with at least one member of a group consisting of:
a highest bandwidth, and
a fewest number of hops.

29. The method of claim 27, wherein
determining the first bandwidth is performed in response to the first station being added to the network.

30. The method of claim 19, wherein the cost of the selected path is periodically transmitted by the listening station.

31. A first station comprising:
a network interface module to:
receive bandwidth data from a second station indicating a bandwidth of a first network section coupling the second station to a third station;
determine a bandwidth of a second network section coupling the first station to the second station;
determine costs for a plurality of paths between the first station and the third station, where
the network interface module to determine the costs comprises the network interface module to receive cost data related to the plurality of paths, wherein
the cost data indicates a bandwidth for a third network section coupling a fourth station to the third station, and
the first station is coupled to the fourth station, and
a cost for a first of the plurality of paths is determined based, at least in part, on the bandwidth of the first network section and the bandwidth of the second network section;
select a path from the plurality of paths based, at least in part, on the costs determined for the plurality of paths; and
transmit, from the first station to a network, a cost of the selected path.

32. The first station of claim 31, wherein the network interface module to select the path comprises the network interface module to select the path with a lowest cost from the plurality of paths.

33. The first station of claim 32, wherein the path with the lowest cost is the path with at least one member of a group consisting of a highest downlink bandwidth and a highest uplink bandwidth.

34. The first station of claim 32, wherein the path with the lowest cost is the path having a lowest number of hops to the third station.

35. A non-transitory computer-readable medium comprising program instructions, the program instructions to:
   receive bandwidth data from a first station indicating a bandwidth of a first network section coupling the first station and a second station;
   determine a bandwidth of a second network section coupling a listening station and the first station;
   determine costs for a plurality of paths between the listening station and the second station, by receiving cost data related to the plurality of paths, wherein
      the cost data indicates a bandwidth for a third network section coupling a third station and the second station, and
      the listening station is coupled to the third station, and
      a cost for a first path of the plurality of paths is determined based, at least in part, on the bandwidth of the first network section and the bandwidth of the second network section;
   select a path from the plurality of paths based, at least in part, on the costs determined for the plurality of paths; and
   transmit, from the listening station to the network, a cost of the selected path.

36. The non-transitory computer-readable medium of claim 35, wherein the program instructions to determine the costs for the plurality of paths comprises the program instructions:
   determine a cost for a second path of the plurality of paths based, at least in part, on the bandwidth of the third network section.

37. The non-transitory computer-readable memory medium of claim 35, wherein the cost data is received from at least one other station via at least one of the plurality of paths.

38. The non-transitory computer-readable medium of claim 35, wherein the program instructions to transmit the cost of the selected path comprises the program instructions to:
   transmit at least one member of a group consisting of a downlink bandwidth, an uplink bandwidth, and a number of hops to reach the second station.

39. The non-transitory computer-readable medium of claim 35, wherein the program instructions to select the path comprises the program instructions to select the path from the plurality of paths having a lowest cost.

40. The non-transitory computer-readable medium of claim 35, wherein the program instructions to determine the costs for the plurality of paths comprises the program instructions to:
   receive bandwidth data from the first station indicating a downlink bandwidth of the first network section;
   determine a downlink bandwidth of the second network section; and
   determine, based at least in part, on the downlink bandwidth of the first network section and on the downlink bandwidth of the second network section, the downlink bandwidth of a composite network, wherein the composite network includes the first network section and the second network section.

* * * * *